United States Patent [19]
Tanaka

[11] Patent Number: 5,193,914
[45] Date of Patent: Mar. 16, 1993

[54] QUAD GUIDE WAY INDEFINITE LINEAR MOTION GUIDE UNIT

[75] Inventor: Kazuhiko Tanaka, Fuchu, Japan

[73] Assignee: Nippon Thompson Co., Ltd., Tokyo, Japan

[21] Appl. No.: 800,805

[22] Filed: Nov. 27, 1991

[30] Foreign Application Priority Data

Nov. 27, 1990 [JP] Japan ................... 2-324967

[51] Int. Cl.⁵ ............................................. F16C 29/06
[52] U.S. Cl. .................................... 384/45; 384/44
[58] Field of Search ................................ 384/43–45

[56] References Cited

U.S. PATENT DOCUMENTS

| | | | |
|---|---|---|---|
| 4,648,726 | 3/1987 | Katahira | 384/45 |
| 4,659,238 | 4/1987 | Teramachi | 384/44 |
| 4,799,805 | 1/1989 | Tanaka | 384/45 X |
| 4,988,215 | 1/1991 | Osawa | 384/45 X |

*Primary Examiner*—Thomas R. Hannon
*Attorney, Agent, or Firm*—Skjerven, Morrill, MacPherson, Franklin & Friel

[57] ABSTRACT

A quad guideway endless linear motion guide unit includes a rail, a slider and a plurality of rolling members interposed between the rail and the slider. The slider includes a center block and a pair of end blocks fixedly attached to the ends of the center block. The rail has four inner guide surfaces and the center block has four outer guide surfaces, each located opposite to a corresponding one of the inner guide surfaces to thereby define a load path section. The center block is formed with four holes, in each of which a sleeve having a passage defining a return path section is fitted. Each of the end blocks is provided with four curved connecting path sections for connecting the corresponding ends of the load and return path sections to thereby define an endless circulating path. The sleeve has a profiled end which is complementary in structure to an associated end of a corresponding one of the curved connecting path sections of the end block.

10 Claims, 8 Drawing Sheets

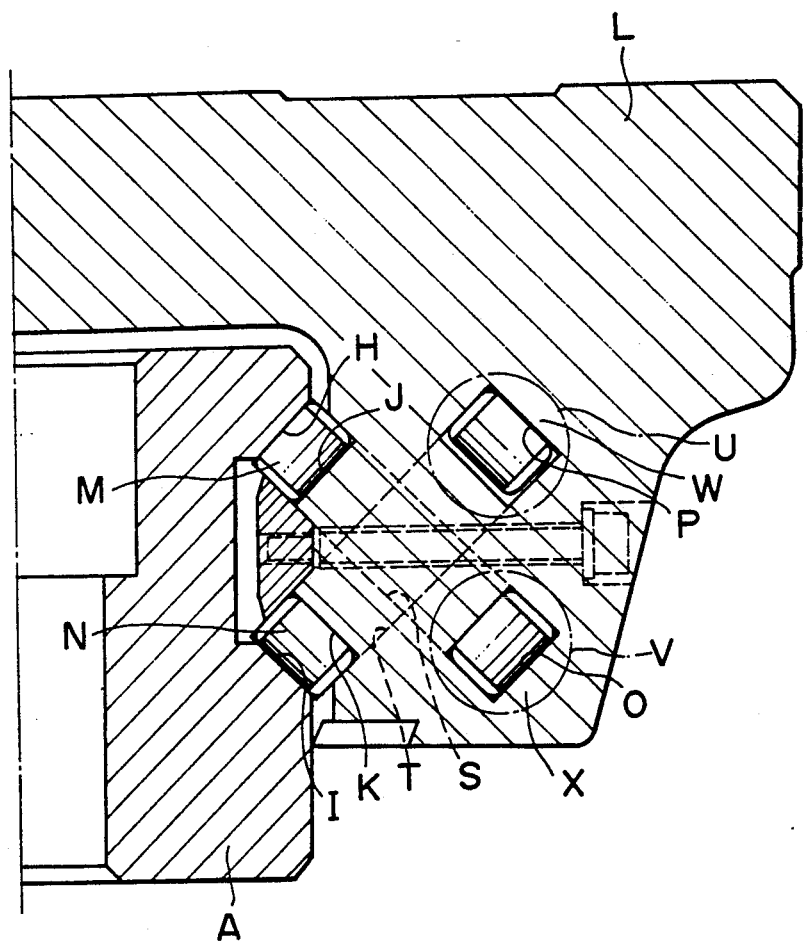

QUAD GUIDE WAY INDEFINITE LINEAR MOTION GUIDE UNIT

BACKGROUND OF THE INVENTION

1. Field of the Invention

This invention generally relates to a linear motion guide unit, and, in particular, to a quad guide-way linear motion guide unit having four guide ways between a rail and a slider to provide an endless relative motion therebetween. More specifically, the present invention relates to an improved multi-guideway linear motion guide unit particularly suitable for use in machining tools, industrial robots or the like as a reciprocating linear motion guide mechanism.

2. Description of the Prior Art

An endless linear motion guide unit is well known. Also well known is a quad guideway endless linear motion guide unit relatively compact in size and having four guide ways between a rail and a slider so as to provide an increased rigidity and accuracy, which is particularly suitable for use as a reciprocating linear motion guide mechanism of various machining tools, industrial robots or the like, which are subjected to intense vibrations and impulsive forces. A typical example of such a quad guideway endless linear motion guide unit is described in Japanese Patent Laid-open Pub. No. 60-139912.

A quad guideway endless linear motion guide unit described in the above-mentioned patent publication is illustrated in FIGS. 9 and 10. As shown in FIG. 9, this prior art guide unit includes a pair of guide rails A and B, which are arranged in parallel as spaced apart from each other, two pairs of sliders C-D and E-F, each pair slidably mounted on a corresponding one of the pair of guide rails A and B, and a slide table Y which is fixedly mounted on these two pairs of sliders C through F. Thus, the slide table Y may move back and forth along the pair of guide rails A and B as indicated by a double-sided arrow G.

FIG. 10 illustrates on an enlarged scale a sliding contact structure between one side of guide rail A and a center block or casing L of either of sliders C and D. As shown in FIG. 10, the guide rail A has a pair of oppositely inclined upper and lower guide surfaces H and I on one side thereof, and since the guide rail A is symmetrical in structure, it also has another pair of oppositely inclined guide surfaces (not shown) on the opposite side thereof. In the illustrated structure, the upper inclined guide surface H is inclined to face generally downward and the lower inclined guide surface I is inclined oppositely to face generally upward.

All of the sliders C through F are identical in structure, and, as shown in FIG. 9, each of these sliders C through F includes a center block or casing L and a pair of front and rear end blocks Q and R fixedly attached to the front and rear ends of the center block of casing L. As well known in the art, each of the sliders C through F is provided with four endless circulating paths, each of which includes a load path section, a return path section and a pair of curved connecting path sections connecting the corresponding ends of the load and return path sections. Each of the endless circulating paths is filled with a plurality of rollers, and these rollers provide a rolling contact between the guide rail and the slider when located in the load path section of the endless circulating path.

As best shown in FIG. 10, each of the sliders C through F is generally inverted-U-shaped structure and thus includes a horizontal section and a pair of vertical sections extending downward from the opposite sides of the horizontal section. Each of the vertical sections is formed with a pair of endless circulating paths, each of which is filled with a plurality of rollers M and N. Described more in detail, in the structure shown in FIG. 10, a pair of endless circulating paths is formed in one leg or vertical section of the slider, and these two endless circulating paths are arranged in an interleaved fashion. That is, one of the endless circulating paths includes a load path section defined by a pair of oppositely facing guide surfaces H and J, a return path section O, and a pair of curved connecting path sections S connecting the corresponding ends of the load and return path sections. In addition, the other endless circulating path includes a load path section defined by a pair of oppositely facing guide surfaces I and K, a return path section P, and a pair of curved connecting path sections T connecting the corresponding ends of the load and return path sections. These load and return path sections H-J, I-K, O and P are formed inside the center block or casing L and the associated curved connecting path sections S and T are formed in the end blocks Q and R.

As shown in FIG. 10, an upper load path section defined by the oppositely facing guide surfaces H and J is located above a lower load path section defined by the oppositely facing guide surfaces K and I, and, furthermore, the return path section P is located above the return path section O. As a result, the curved connecting path sections S and T, which belong to the interleaved different endless circulating paths, are disposed in a crossed arrangement.

However, in the structure described above, difficulty was encountered in forming the rectangularly shaped return path sections O and P at high accuracy and in obtaining a precise alignment between the curved connecting path sections S and T formed in each of the end blocks Q and R and the load and return path sections formed in the center block or casing L when assembled.

In order to cope with the above-mentioned problems, a proposal was made to form a pair of circularly shaped holes U and V in the leg or vertical section of the center block or casing L and then fitting a sleeve W or X, which has been previously formed with a rectangularly shaped return path section P or O, into the corresponding one of such holes U and V. However, even in this case, the alignment problems between the center block or casing L and the associated end blocks Q and R and the sleeves W and X and between the curved connecting path sections S and T and the return path sections 0 and P still remained. In addition, there was a problem of increased sliding resistance against cylindrical rollers M and N using grease as a lubricant within the return path sections O and P.

SUMMARY OF THE INVENTION

In accordance with the present invention, there is provided an endless linear motion guide unit which generally includes a rail, a slider and a plurality of rolling members interposed between the rail and the slider. The slider is formed with at least one endless circulating path which includes a load path section, a return path section, and a pair of curved connecting path sections connecting the corresponding ends of the load and return path sections. The slider includes a center block and a pair of end blocks which are fixedly attached to the front and rear ends of the center block. The load and return path sections are formed in the center block and each of the pair of curved connecting path sections is formed in each of the front and rear end blocks.

The load path section is defined by a pair of inner and outer guide surfaces with the inner guide surface being formed on the center block of the slider and the outer guide surface being formed on one side of the rail in an opposed relationship. The return path section is defined as a passage formed in a sleeve which is fitted into a hole formed in the center block of the slider. The sleeve is preferably comprised of a synthetic resin material either in a unitary structure or in a split structure. The sleeve is cylindrical and elongated in structure and has a profiled end surface at each end. Each end or mouth of the curved connecting path formed in each of the front and rear end blocks has a complementary profiled structure so that a mating connection is provided between the profiled end surface of the sleeve and the associated, complementarily profiled mouth of the curved connecting path.

Preferably, the rolling members are cylindrical rollers and the passage formed in the sleeve has a rectangularly shaped cross section having two pairs of oppositely facing guide surfaces, each of which is formed with a recess for reserving therein a lubricant, such as oil. In a preferred embodiment, the rail has a pair of oppositely inclined upper and lower guide surfaces at each of its opposite sides and the slider a horizontal section and a pair of vertical sections or legs depending from the opposite sides of the horizontal section. Each of the vertical sections is provided with a pair of endless circulating paths, each including a return path section defined by a sleeve having the above-described structure. Preferably, the pair of endless circulating paths is arranged such that their curved connecting path sections are crossed when viewed in the longitudinal axis of the unit.

It is therefore a primary object of the present invention to provide an improved endless linear motion guide unit high in accuracy and performance and smooth in operation.

Another object of the present invention is to provide an improved endless linear motion guide unit simple in structure, easy to manufacture and thus low at cost.

A further object of the present invention is to provide an improved high durability and low noise endless linear motion guide unit compact in size.

A still further object of the present invention is to provide an improved endless linear motion guide unit having an increased structural integrity when assembled without increasing a sliding resistance.

Other objects, advantages and novel features of the present invention will become apparent from the following detailed description of the invention when considered in conjunction with the accompanying drawings.

BRIEF DESCRIPTION OF THE DRAWINGS

FIG. 10 is a schematic illustration showing in transverse cross section one half of the typical prior art quad guideway endless linear motion guide unit employed in the assembly shown in FIG. 9.

DESCRIPTION OF THE PREFERRED EMBODIMENTS

Figure 1:
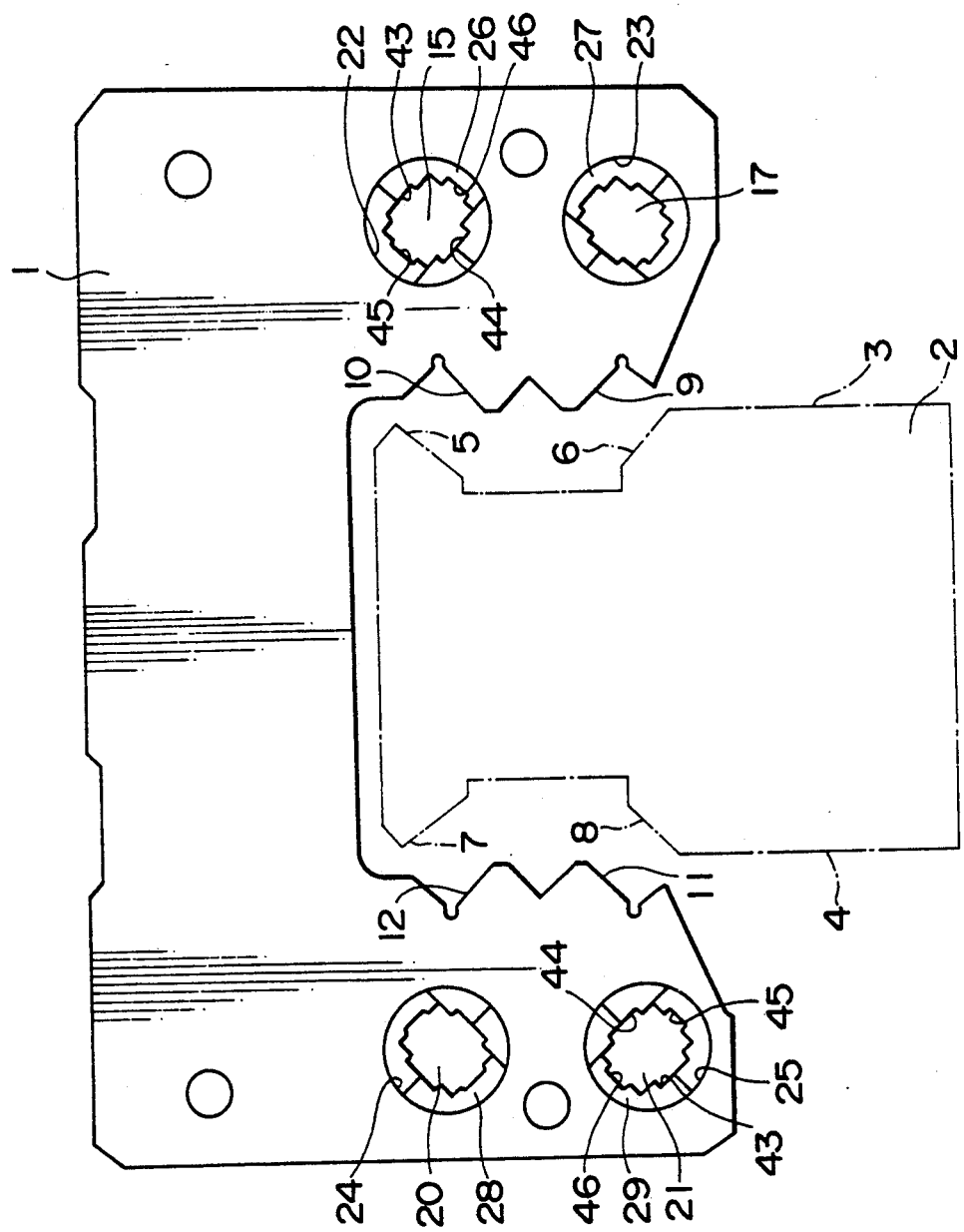
FIG. 1 is a schematic illustration showing partly in transverse cross section a quad guideway endless linear motion guide unit constructed in accordance with one embodiment of the present invention.
Figure 2:
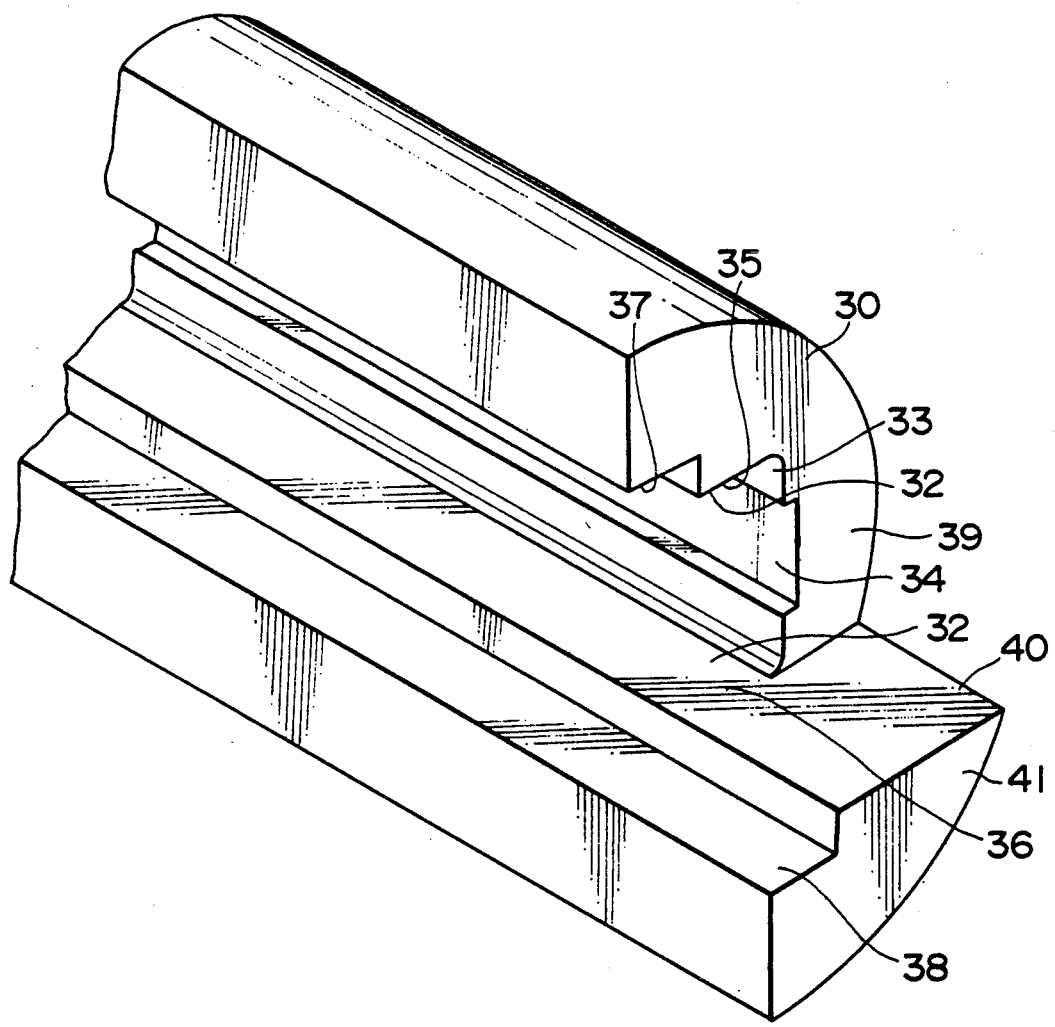
FIG. 2 is a schematic illustration showing in part in perspective view one end of a sleeve half of a slit sleeve having a passage defining a return path section employed in the structure shown in FIG. 1.
Figure 3:
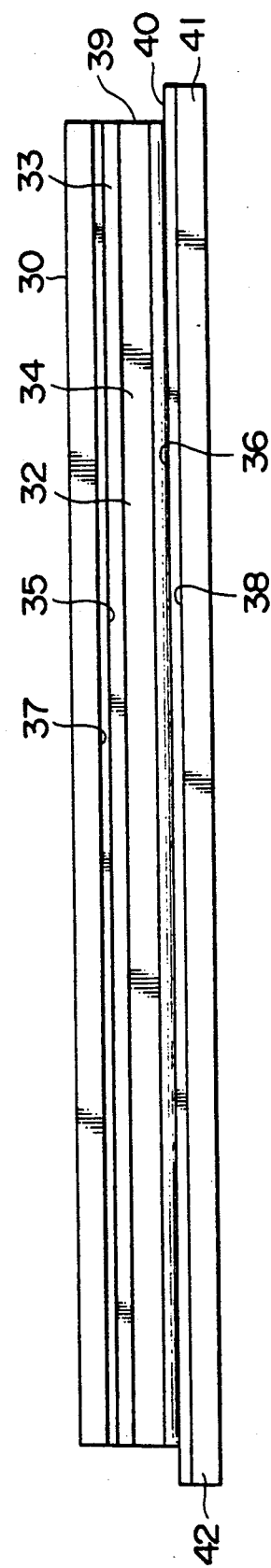
FIG. 3 is a schematic illustration showing in side elevation the sleeve half of FIG. 2.
Figure 4:
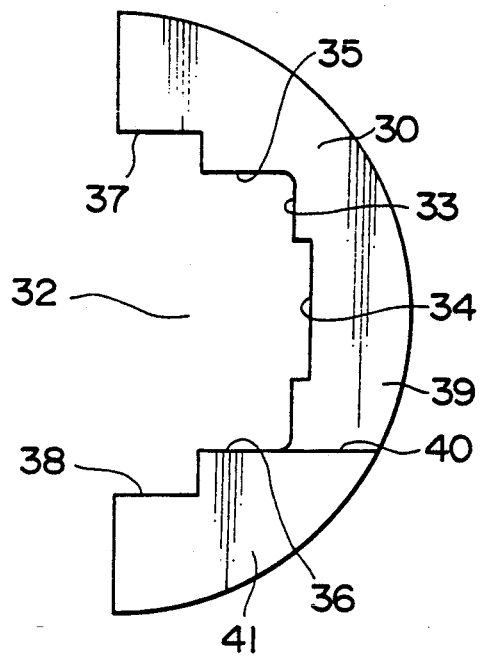
FIG. 4 is a schematic illustration showing in front view on a somewhat enlarged scale the sleeve half of FIG. 2.

Referring now to FIG. 1, there is schematically shown a quad guideway endless linear motion guide unit constructed in accordance with one embodiment of the present invention. As shown, the present guide unit is structurally similar in many respects to the guide unit shown in FIG. 10 and thus it generally includes a rail 2, a slider including a center block or casing 1, and a plurality of cylindrical rollers (not shown in FIG. 1). Thus, the rail 2 extends straight over a desired length and it has a generally rectangular cross section having a pair of opposite sides 3 and 4, each formed with a recess to thereby define a pair of oppositely inclined upper and lower inner guide surfaces 5 and 6 or 7 and 8. As shown in FIG. 1, the upper inclined inner guide surfaces 5 and 7 face generally downward and the lower inclined inner guide surfaces 6 and 8 face generally upward.

The guide unit shown in FIG. 1 also includes a three-part slider which is slidably mounted on the rail 2, and the slider includes a center block or casing 1 and a pair of end blocks 13 (shown in FIGS. 6 and 7) which are fixedly attached to the front and rear ends of the center block 1. The slider and thus the center block 1 has a generally inverted-U-shaped cross section so that the center block 1 has a horizontal section and a pair of legs or vertical sections depending from the opposite sides of the horizontal section. As shown in FIG. 1, each of the vertical sections is provided with a pair of endless circulating paths, each including a load path section, a return path section and a pair of curved connecting path sections connecting the corresponding ends of the load and return path sections.

In the structure shown in FIG. 1, each of the vertical sections of the center block 1 has an inner surface which is located opposite to a corresponding side 3 or 4 of the rail 2 and which is formed with a pair of upper and lower oppositely inclined outer guide surfaces 10 and 9 or 12 and 11 in an opposed relationship with a corresponding one of the associated inner guide surfaces 5 and 6 or 7 and 8. For example, the upper outer guide surface 10 is located opposite to the upper inner guide surface 5 with a predetermined gap therebetween and the lower outer guide surface 9 is in an opposed relation with the lower inner guide surface 6. Similarly, the upper outer guide surface 12 is located opposite to the upper inner guide surface 7 with a predetermined gap therebetween and the lower outer guide surface 11 is located opposite to the lower inner guide surface 8.

Thus, on the side 3 of the rail 2, an upper load path section is defined between a pair of associated upper inner and outer guide surfaces 5 and 10 and a lower load path section is defined between a pair of associated lower inner and outer guide surfaces 6 and 9. Similarly, on the side 4 of the rail 2, an upper load path section is defined between a pair of associated upper inner and outer guide surfaces 7 and 12 and a lower load path section is defined between a pair of associated lower inner and outer guide surfaces 8 and 11. Cylindrical rollers M (not shown in FIG. 1) are provided in the upper load path sections defined between upper inner and outer guide surfaces 5 and 10 and 7 and 12 and cylindrical rollers N (not shown in FIG. 1) are also provided in the lower load path sections defined between lower inner and outer guide surfaces 6 and 9 and 8 and 11 to provide a rolling contact between the center block 1 or for that matter the slider and the rail 2.

The center block 1 is provided with four throughholes 22, 23, 24 and 25, each having a circular cross section, at its pair of vertical sections, and sleeves 26, 27, 28 and 29 are fitted into the through-holes 22, 23, 24 and 25, respectively. Each of the sleeves 26, 27, 28 and 29 has passage 15, 17, 20 and 21, respectively, and these passages 15, 17, 20 and 21 define respective return path sections. Thus, the passage 15 defines a right upper return path section and the passage 17 defines a right lower return path section. Similarly, the passage 20 defines a left upper return path section and the passage 21 defines a left lower return path section.

In the preferred embodiment, the sleeves 26, 27, 28 and 29 are identical in shape and are comprised of a synthetic resin material. In the structure shown in FIG. 1, these sleeves 26, 27, 28 and 29 have a split structure comprised of a pair of complementary sleeve halves as will be described in detail later. As will also be described later, these sleeves 26, 27, 28 and 29 may also be constructed to have a unitary structure, if desired.

It is to be noted that the passage 15, 17, 20 or 21, which defines a return path section of the endless circulating path, has a generally rectangular cross sectional shape so as to allow rollers to move therethrough rollingly. The passage or return path section 15 is associated with the lower load path section defined between the lower inner and outer guide surfaces 6 and 9 so that rollers N will rollingly move between these load and return path sections through a pair of curved connecting path sections connecting the corresponding ends of the load and return path sections, as will become clear later. Thus, the passage or return path section 15 and the load path section defined between lower inner and outer guide surface 6 and 9 define a part of one endless circulating path.

On the other hand, the passage or return path section 17 is associated with an upper load path section defined between the upper inner and outer guide surfaces 5 and 10 and they form a part of another endless circulating path. As a result, rollers M will rolling move between these load and return path sections through a pair of curved connecting path sections connecting the corresponding ends of these load and return path sections.

Similarly, the passage 20 defining another return path section is associated with a lower load path section defined between the lower inner and outer guide surfaces 8 and 11, and these load and return path sections define a part of another endless circulating path on the side 4 of the rail 2. Moreover, the passage 21 defining a further return path section is associated with an upper load path section defined between the upper inner and outer guide surfaces 7 and 12, and these load and return path sections define a part of a further endless circulating path on the side 4 of the rail 2.

Figure 6:
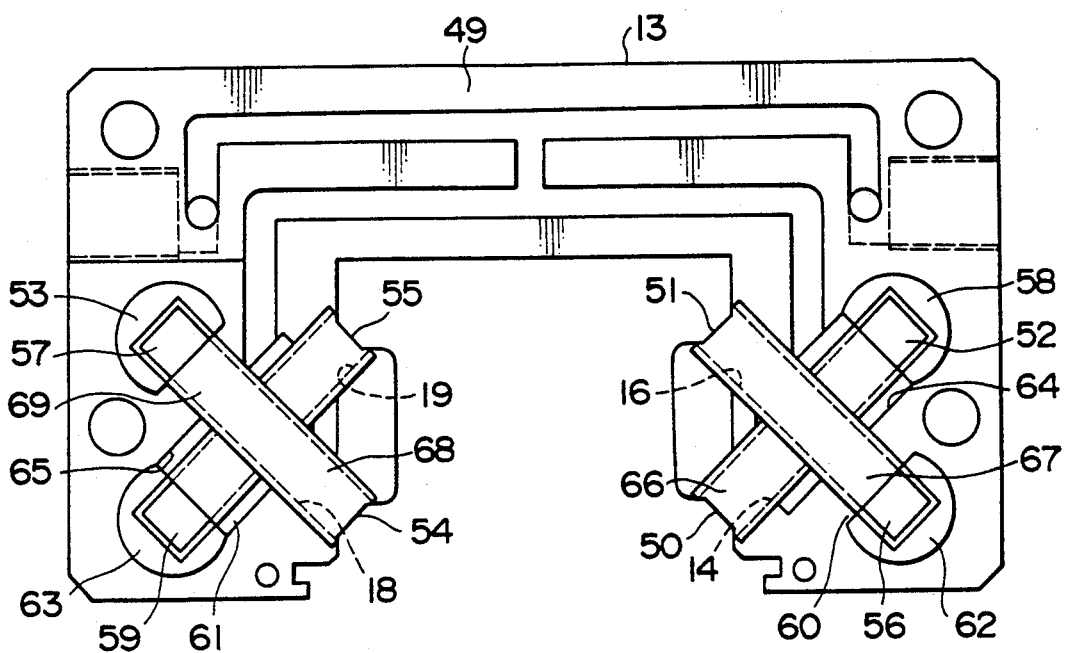
FIG. 6 is a schematic illustration showing in front view an end block which forms a part of a slider in the structure shown in FIG. 1.
Figure 7:
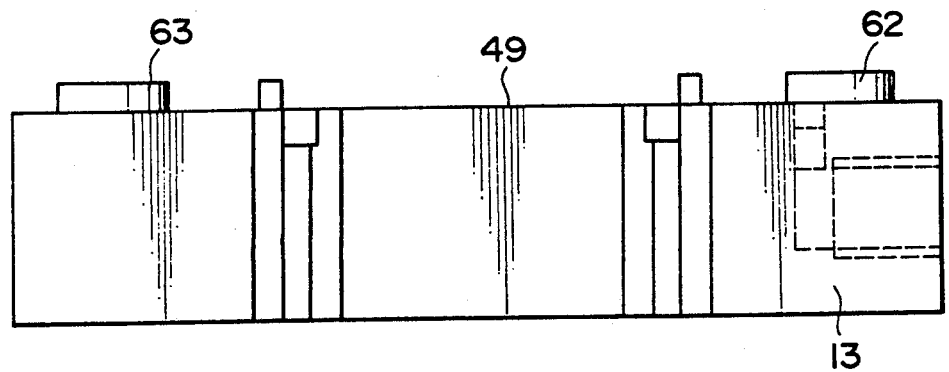
FIG. 7 is a schematic illustration showing in bottom view the end block shown in FIG. 6.
Figure 9:
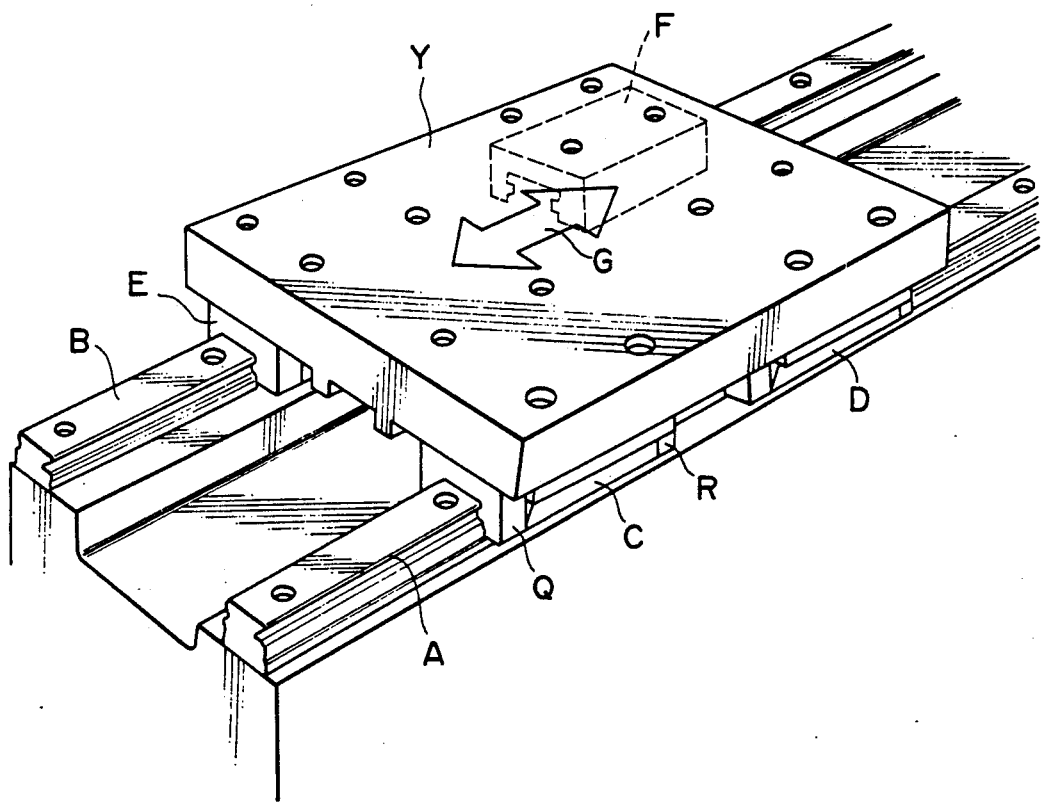
FIG. 9 is a schematic illustration showing in perspective view a typical prior art quad guideway endless linear motion guide unit assembly.

In a manner similar to the structure shown in FIGS. 9 and 10, an end block 13 shown in FIGS. 6 and 7 is fixedly attached to each of the front and rear ends of the center block 1 shown in FIG. 1. As will be described more in detail later, the end block 13 is formed with two pairs of curved connecting path sections, each pair including two curved connecting path sections 14 and 16 or 18 and 19 disposed in a crossed arrangement. Thus, the right upper return path section 15 is in communication with the lower load path section defined between the lower inner and outer guide surfaces 6 and 9 through the curved connecting path sections 14, and the right lower return path section 17 is in communication with the upper load path section defined between the upper inner and outer guide surfaces 5 and 10. In addition, the left upper return path section 20 is in communication with the lower load path section defined between the lower inner and outer guide surfaces 9 and 11 and the left lower return path section 21 is in communication with the upper load path section defined between the upper inner and outer guide surfaces 7 and 12.

Now, the structure of each of the sleeves 26 through 29 will be described in detail with reference to FIGS. 2 through 5 and, since they are identical in structure in the illustrated embodiment, a description will be had only with respect to sleeve 26 as a representative example.

Figure 5:
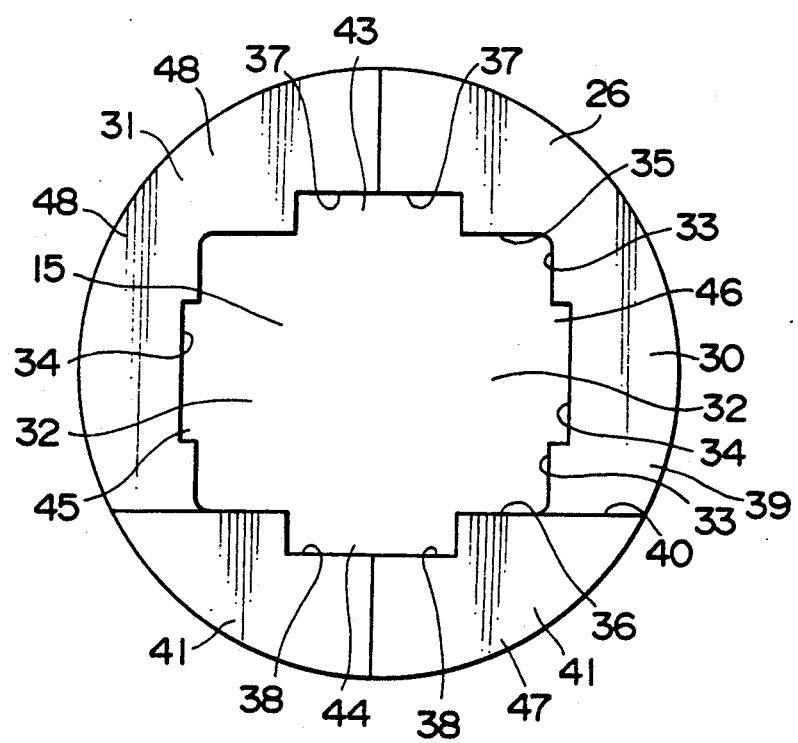
FIG. 5 is a schematic illustration showing in front view on a somewhat enlarged scale of a split sleeve including the sleeve half shown in FIG. 2.

As best shown in FIG. 5, the sleeve 26 of the illustrated embodiment is a split sleeve comprised of a pair of complementary sleeve halves 30 and 31 having a mirror image structure. The structure of the sleeve half 30 is shown in detail in FIGS. 2 through 4. As shown, the sleeve half 30 is generally elongated in shape and formed with a longitudinally extending main groove 32 which is generally rectangular in cross sectional shape. A side recess 34 is formed in a side surface 33 of the main groove 32 with a top recess 37 and a bottom recess 38 formed in a top surface 35 and a bottom surface 36 of the main groove 32, respectively. These recesses 34, 37 and 38 serve as an oil pockets or reservoirs for lubricants.

Of importance, the sleeve half 30 does not have a flat end surface, but instead has a profiled mating structure. In the illustrated embodiment, the sleeve half 30 has a projection 41 or 42 projecting in the longitudinal direction and a setback section defined by a horizontal side wall 40 of the projection 41 or 42 and a vertical end surface 39. In the illustrated embodiment, the projections 41 and 42 of the complementary sleeve halves 30 and 31 define a crescent shape when combined; however, it is to be noted that such projections 41 and 42 may have any desired shape.

As best shown in FIG. 5, when a pair of complementary sleeve halves 30 and 31 are combined to define an integrated split sleeve 26 with the mating surfaces of these sleeve halves 30 and 31 in contact, there is defined a passage or return path section 15 by the combined main grooves 32 of these sleeve halves 30 and 31. It is to be noted that the passage or return path section 15 extends all the way along the longitudinal axis of the split sleeve 26 thus combined, and, similarly, all of the recesses 43, 44, 45 and 46 also extend all the way along the longitudinal axis of the combined sleeve 26.

As best shown in FIG. 5, when the sleeve halves 30 and 31 are combined, the two projections 41 of these sleeve halves 30 and 31 define a crescent-shaped projection 47, and a horse shoe shape setback section 48 is defined by the end surfaces 39 and the side surfaces 40. As described previously, however, the combined projection 47 and the setback section 48 may have any other desired shape.

FIGS. 6 and 7 illustrates in detail the structure of the end block 13 fixedly attached to each of the front and rear ends of the center block 1. The end block 13 has a mating surface 49 which is brought into contact with one end surface of the center block 1 and which is formed with a pair of right and left X-shaped cut-away portions 64 and 65. In the right X-shaped cut-away portion 64 is disposed a pair of preform members 66 and 67, defining a pair of curved connecting path sections 14 and 16 disposed in a crossed arrangement, in the right X-shaped cut-away portion 64 in a crossed arrangement, and, similarly, a pair of preform members 68 and 69, defining a pair of curved connecting path sections 18 and 19 extending in a crossed arrangement, is disposed in the left X-shaped cut-away portion 65.

Each of the curved connecting path sections 14, 16, 18 and 19 has one end 50, 51, 54 and 55, respectively, which is open to and connected to one end of a corresponding one of the outer guide surfaces 9, 10, 11 and 12 of the center block 1, respectively, and the other end 52, 56, 57 and 59, respectively, which are defined at the mating surface 49 of the end block 13 so as to be in communication with the respective return path sections 15, 17, 20 and 21 of the center block 1.

As best shown in FIGS. 6 and 7, the ends or mouths 52, 56, 57 and 59 at the mating surface 49 of the end block 13 are formed with projections 58, 62, 53 and 63 each having a shape complementary to the shape of the setback portion 48 at the end of the combined sleeve 26 shown in FIG. 5. As shown in FIG. 6, each of the ends or mouths 52, 56, 57 and 59 has a generally rectangular cross sectional shape and three sides of each of these ends or mouths 52, 56, 57 and 59 are surrounded by a corresponding one of the projections 58, 62, 53 and 63 with the remaining one side thereof indicated by 60 or 61 being in flush with the mating surface 49 of the end block 13.

In the present embodiment, a pair of complementary sleeve halves 30 and 31 is combined to define a complete sleeve 26, and such a sleeve 26 is fitted into a corresponding one of the through-holes 22-25. Then, the end surface of the projection 47 of the sleeve 26 is brought into abutment against the mating surface 49 of the end block 13 with the setback section 48 thereof in registry with a corresponding one of the projections 58, 62, 53 and 63 of the end block 13 to establish a relative positional relationship among the center block 1, sleeve 26 and end block 13 at high accuracy. As a result, the return path sections 15, 17, 20 and 21 are brought into alignment with the associated ends of the curved connecting path sections 14, 16, 18 and 19, respectively, at high accuracy, so that assembling of the slider may be completed by tightening the center and end blocks 1 and 13 together tightly by bolts or the like.

Figure 8:
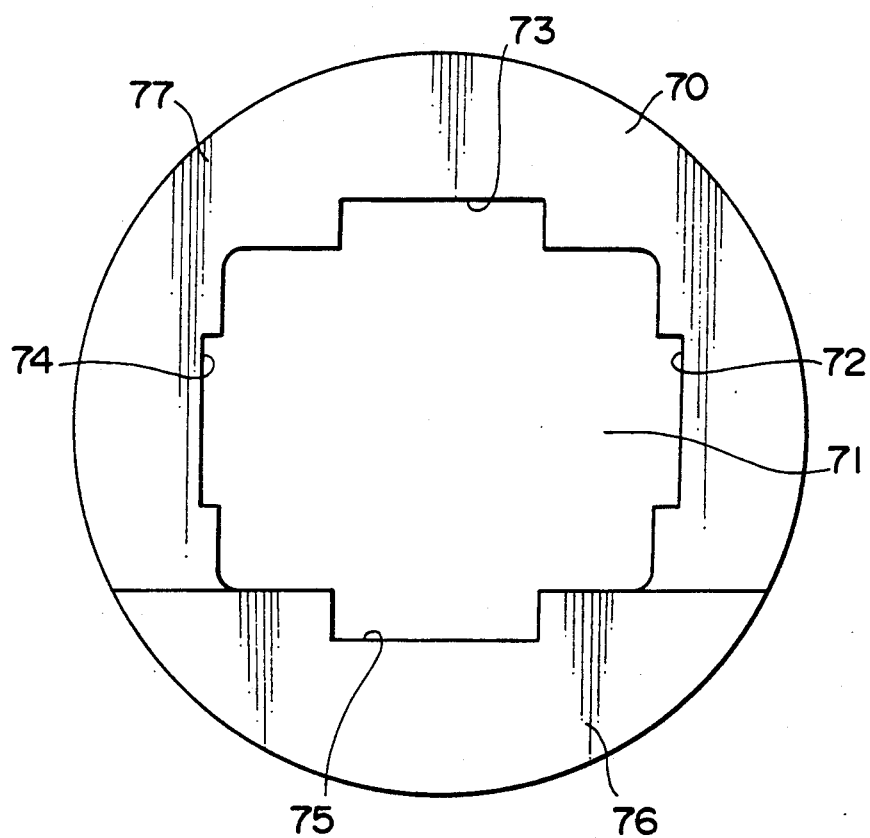
FIG. 8 is a schematic illustration showing in front view on a somewhat enlarged scale a sleeve having a unitary structure in another embodiment of the present invention.

In the embodiment described above, the sleeve 26 has a split structure including a pair of complementary sleeve halves 30 and 31. As an alternative structure, FIG. 8 illustrates another sleeve 70 having an integrated or unitary structure comprised of a synthetic resin material. As shown in FIG. 8, the sleeve 70 also has a passage 71 which extends all the way along its longitudinal axis to thereby define a return path section. The passage 71 also has a generally rectangularly shaped cross section and it is formed with a recess 72, 73, 74 and 75 at each of its four side surfaces. These recesses also extend all the way along the longitudinal axis of the sleeve 70 and they serve as oil pockets or reservoirs for lubricants. In addition, similarly with the previously described embodiment, the sleeve 70 also has a profiled mating end structure at each end, and in this embodiment, the sleeve 70 has a projection 76 having a crescent shaped cross section and a horse shoe shaped setback section 77. Thus, the embodiment shown in FIG. 8 functions substantially the same manner as that of the previously described split sleeve.

It is to be noted that the projections 47 and 76 and the setback sections 48 and 77 may have any desired shapes as long as they serve to establish expected alignment among elements of the slider. However, these projections 47, 76 and the setback sections 48, 77 should be so shaped that they prevent the sleeves 26 and 70 from rotating within the holes 22-25 freely.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A linear motion guide unit, comprising:
   a rail including an inner guiding means;
   a slider including a center block and a pair of end blocks located on opposite ends of said center block, said center block including an outer guiding means located opposite to and spaced apart from said inner guiding means to thereby define a load path section, said center block including a sleeve fitted into a hole formed therein, said sleeve including a passage which defines a return path section, said sleeve having a first profiled structure at each end, and each of said pair of end blocks including a curved connecting path section having one end connected to one end of said load path section and another end, which has a second profiled structure complementary to said first profiled structure, connected to one end of said return path section to thereby define an endless circulating path; and
   a plurality of rolling members filled said endless circulating path;
   wherein one of said first and second profiled structures includes an elongated projection which defines a first part of said return path section and the other of said first and second profiled structures includes a recess which defines a second part of said return path section complementary to said first part in a circumferential direction for receiving said elongated projection to thereby define a mating connection therebetween.

2. The unit of claim 1, wherein said sleeve is comprised of a synthetic resin material.

3. The unit of claim 1, wherein said sleeve has a split structure comprised of a plurality of sleeve segments.

4. The unit of claim 3, wherein said sleeve includes a pair of complementary sleeve halves.

5. The unit of claim 1, wherein said sleeve has a unitary structure.

6. The unit of claim 1, wherein said hole has a circular cross section and said sleeve is cylindrical in shape.

7. The unit of claim 6, wherein said rolling members are rollers and said passage defining said return path section has a generally rectangular cross sectional shape.

8. The unit of claim 1, wherein said inner guiding means includes a first pair of oppositely inclined upper and lower inner guide surfaces at each side of said rail and said outer guiding means includes a second pair of oppositely inclined lower and upper outer guide surfaces corresponding to said first pair.

9. The unit of claim 8, wherein said center block includes four holes in each of which said sleeve is fitted and each of said pair of end blocks includes four of said curved connecting path sections, whereby two of said curved connecting path sections are disposed in a crossed arrangement to define said endless circulating path together with the associated load and return path sections.

10. The unit of claim 1, wherein said passage defining said return path section is provided with at least one elongated recess serving as a reservoir for lubricant.

* * * * *